United States Patent [19]

Vandling

[11] 3,828,185

[45] Aug. 6, 1974

[54] MODULATED LIGHT COMMUNICATION SYSTEM

[75] Inventor: John M. Vandling, Pleasantville, N.Y.

[73] Assignee: The Singer Company, New York, N.Y.

[22] Filed: Dec. 1, 1960

[21] Appl. No.: 73,151

[52] U.S. Cl. .................. 250/199, 332/7.51, 343/175

[51] Int. Cl. ............................................. H04b 9/00

[58] Field of Search ................ 250/7, 199; 343/175; 332/7.51

[56] References Cited

UNITED STATES PATENTS

| | | | |
|---|---|---|---|
| 1,967,215 | 7/1934 | Acht | 88/57 |
| 2,032,588 | 3/1936 | Miller | 250/7 |
| 2,206,169 | 7/1940 | Eisenhut | 250/7 |
| 2,475,127 | 7/1949 | Carlson | 343/175 |
| 2,970,310 | 1/1961 | Bruce | 240/366 |
| 2,982,859 | 5/1961 | Steinbrecher | 250/205 |

FOREIGN PATENTS OR APPLICATIONS

| | | | |
|---|---|---|---|
| 124,805 | 4/1919 | Great Britain | 250/7 |
| 400,115 | 10/1933 | Great Britain | 250/7 |

*Primary Examiner*—Maynard R. Wilbur
*Assistant Examiner*—N. Moskowitz
*Attorney, Agent, or Firm*—T. W. Kennedy

EXEMPLARY CLAIM

35. A transmitter-receiver for a communication system, comprising, an electrical source of light, a power supply for said source, means for varying the amount of power furnished to said source in accordance with a signal whereby the light emitted by said source is modulated, a concave mirror, a partly transparent and partly reflective mask interposed in the light path between said source and said concave mirror whereby a portion of the light from said source is transmitted through said mask to said mirror and reflected in a beam directed to a remote point, and photosensitive means for generating a signal in accordance with the variations of the intensity of light incident thereon, said photosensitive means being positioned to receive light from said remote point after reflection by said concave mirror and said mask.

35 Claims, 10 Drawing Figures

*INVENTOR.*
JOHN M. VANDLING

*BY* [signature]

ATTORNEY.

PATENTED AUG 6 1974 3,828,185

SHEET 2 OF 3

INVENTOR.
JOHN M. VANDLING

BY H. L. Mackey

ATTORNEY.

INVENTOR.
JOHN M. VANDLING

BY H. A. Mackey

ATTORNEY.

MODULATED LIGHT COMMUNICATION SYSTEM

This invention relates generally to communication systems and particularly to such systems in which the intelligence is transmitted by means of a modulated light beam.

There is a growing need, especially in military applications, for small, light weight communication systems suitable for use over short ranges such as line of sight distances. For example, a foot soldier at a forward observation post obviously needs to report his observations to his headquarters. His communication system must be readily portable and preferably should not require trailing wires. It must be secure against detection by the enemy, not only as to the context of the message but as to the fact of transmission itself. These requirements may be substantially met by a system employing a beam of infra red light but so far as applicant is aware, no completely satisfactory system has as yet been developed.

It is a general object of the present invention to provide a small, light weight communication system.

Another object is to provide a communication system requiring no wires between the transmitter and the receiver.

Another object is to provide a communication system in which the possibility of detection by unauthorized persons is minimized.

Another object is to provide a communication system in which only a modest source of power is required at the transmitting station.

Briefly stated, one feature of the invention includes apparatus for collimating light from a source and breaking the light into a pattern of alternate light and shadow by means of a number of opaque and/or reflective elements. The pattern is converged to a spot on a small plane mirror from whence it is reflected back to the reflective or opaque elements which originally formed the pattern. Oscillation of the small mirror in accordance with a signal causes the reformed pattern to fall more or less on the elements with the result that a beam of modulated light is transmitted to the receiving station where the signal is recovered. In accordance with another feature, the light source may be located at either the transmitting or the receiving station.

For a clearer understanding of the above and other features of the invention, reference may be made to the following detailed description and the accompanying drawing, in which.

Figure 1:
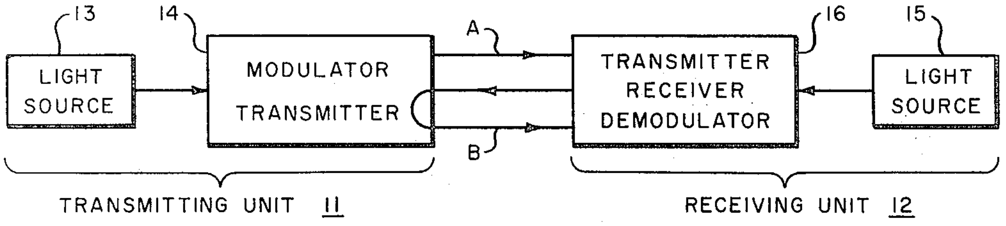
FIG. 1 is a block diagram of a two station communication system.

Communication between two points by means of a modulated light beam obviously requires that light be modulated at a first station and transmitted to a second station where the modulation is recovered. The unmodulated light source may be at either station and in accordance with one feature of the invention the first and second stations are each provided with a light source, either of which may be used. This feature is illustrated schematically in FIG. 1 which shows a transmitting unit 11 located at one station and a receiving unit 12 located at the other station. The transmitting unit 11 may be thought of as comprising a light source 13 and a modulator-transmitter 14 while the receiving unit 12 may be thought of as comprising a light source 15 and a transmitter-receiver-demodulator 16. Either, but not both, light sources may be used. When the source 13 is used, the light is modulated and transmitted by the modulator-transmitter 14 and propagated as by the path A to the receiving unit 12 where the signal is recovered. When the source 15 is used, the light is transmitted to the unit 11 where it is modulated and retransmitted, as by the path B, to the receiving unit 12 where the signal is recovered.

Figure 2:
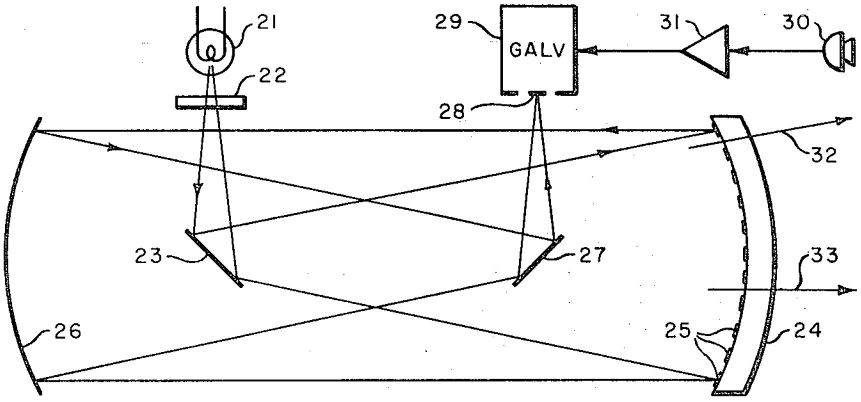
FIG. 2 is a schematic illustration of a transmitter unit.

Referring now to FIG. 2, there is shown one form of transmitting unit in accordance with the invention. There is shown a light source 21 which may emit light in any or all portions of the infra red, visible and ultra violet portions of the spectrum. The invention may be used with any of these forms of light and the word "light," unles otherwise specified or required by the context, is intended to include both visible and invisible portions of the spectrum. However, for military applications such as previously mentioned, infra red light is at present preferred and accordingly a filter 22 is provided which allows only infra red light to pass.

After passing through the filter 22 the light is reflected by a plane mirror 23 to a zero power lens 24. This lens has a concave surface partially covered with a reflective coating arranged in a pattern so that those rays striking the coating are reflected while the remainder pass through the lens 24 without significant refraction. The pattern of the reflective coating may take various geometric forms but at present a simple arrangement comprising rectangular bars or strips 25, with spaces between equal to the width of the strips, is preferred.

The strips 25, placed as they are on the concave surface of the lens 24, constitute a half concave mirror. The curvature of the concave surface and the distances from the lens 24 to the plane mirror 23 and from the plane mirror to the light source 21 are selected so that the source 21 is effectively at the principal focus of the half mirror. Accordingly, those rays of light from the source 21 which strike the reflective strips 25 are reflected in rays parallel to the axis of the lens 24. Obviously the same result would be achieved if the source 21 were placed on the axis at a distance equal to the focal length from the half concave mirror or if more than one specular reflective element such as the mirror 23 were employed provided the total distance of the light path from the mirror to the source were maintained equal to the focal length. The expression "effectively at the principal focus" is intended to include all such arrangements.

A full concave mirror 26, positioned on the same axis as the lens 24, receives the light from the reflective strips 25 which at this point is collimated light in a bar pattern, that is, alternate strips of light and shadow. The mirror 26 converges the rays and at an axial position short of the principal focus there is a plane mirror 27, which directs the converted rays to one side where they fall on another small plane mirror 28. As before, the curvature of the mirror 26 and the various distances are selected so that the plane mirror 28 is effectively at the principal focus of the mirror 26. Accordingly, the bar pattern is focused to a tiny spot on the mirror 28.

The mirror 28 is mounted on a pivot the axis of which, in the schematic showing of FIG. 2, is perpendicular to the plane of the paper. The mirror 28 is resiliently held substantially in the position shown in FIG. 2 but may be displaced about its pivot in accordance with intelligence signals. An acoustic diaphragm may be mechanically connected to the mirror 28 so as to rotate it directly in response to acoustic energy but for the military purposes above mentioned it is preferred that the mirror 28 constitute an integral part of a galvanometer 29 as will be more fully explained. A dynamic microphone 30 generates a small voltage in response to incident acoustic energy which voltage is amplified by a small transistor amplifier 31 and applied to the winding of the galvanometer 29.

In the absence of a signal, the mirror 28 is in substantially the position shown and light incident thereon is reflected back along nearly but not quite the same path by which it arrived. As the rays of light leave the mirror 28, they diverge, are reflected by the plane mirror 27, collimated by the concave mirror 26, and the bar pattern is reformed on the concave surface of the lens 24 and the reflective strips 25. The angular position of the plane mirrors 27 and 28 are adjusted so that the bars of light fall not entirely on the reflective strips 25 from whence they originated but half on the strips 25 and half on the uncoated surface of the lens 24. Thus one half of the light is transmitted through the lens 24 toward the receiving station in a narrow beam of substantially parallel rays while the other half of the light is reflected back to the light source 21. When the mirror 28 is oscillated about its normal position by a signal, more or less light is transmitted through the lens 24 toward the receiving station, such variations constituting an amplitude modulated light beam. As mentioned above, in the absence of a signal one half of the available light is transmitted through the lens 24. Sufficient deflection of the mirror 28 in one direction cuts off the light completely while a like deflection in the opposite direction permits all of the available light to be transmitted. Thus, close to 100 per cent modulation is obtainable.

Summarizing the operation, it can be seen that light from the source 21 passes through the infra red filter 22, is reflected by the plane mirror 23, and reaches the zero power lens 24 and reflective strip 25 is a diverging beam. One half of the light, illustrated by the ray 32, passes through the lens 24 without significant refraction and, for the purpose of the present invention, is lost. The other half of the light is reflected and collimated by the reflective strips 25, is transmitted in the form of a bar pattern to the concave mirror 26, thence to the plane mirror 27 and to the small plane mirror 28 where it appears as a small spot of light. The small spot is reflected back to the plane mirror 27, to the concave mirror 26 and to the lens 24 where the reformed bar pattern appears, one half on the strips 25 and one half on the lens 24. The half falling on the lens 24 is transmitted in a narrow beam of substantially parallel rays as illustrated by the ray 33 toward the receiving station. An acoustic signal on the microphone 30 causes the mirror 28 to oscillate, resulting in an amplitude modulation of the beam transmitted toward the receiving station.

Figure 3:
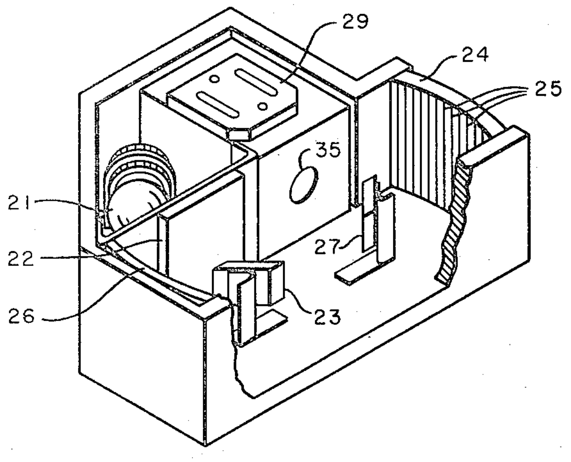
FIG. 3 is a pictorial view of the transmitting unit shown schematically in FIG. 2.

The apparatus shown schematically in FIG. 2 may be physically realized in a very compact form, as shown pictorially in FIG. 3. There can be seen the light source 21, the infra red filter 22, the plane mirror 23 and the zero power lens 24 with the reflective strips 25 on the concave surface. Also visible is the top of the concave mirror 26, the top and one edge of the plane mirror 27 and the top of the case of the galvanometer 29. The mirror 28 of the galvanometer lies behind the aperture 35 and is not visible in FIG. 3. The entire assembly exclusive of the power supply, the microphone 30 and the amplifier 31, but including the cover (not shown) is contained within a housing less than 2¾ inches long by 2¼ inches wide by 1 inch deep.

Figure 4:
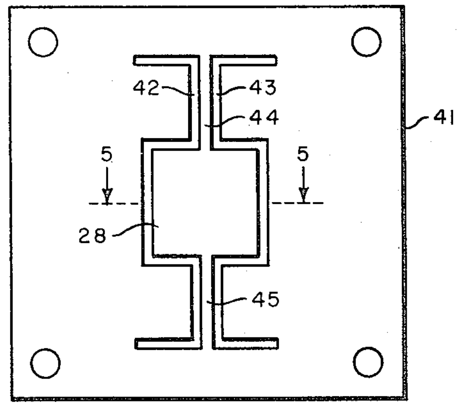
FIG. 4 is an elevation view, partly schematic, of a typical mounting for the mirror of a mirror galvanometer.
Figure 5:
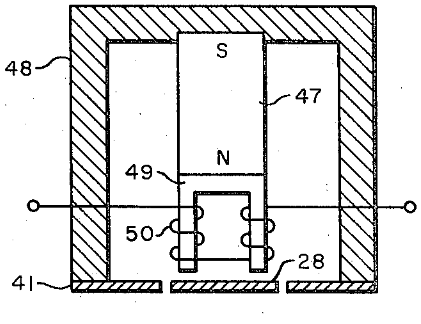
FIG. 5 is a cross section view, partly schematic, of the magnetic operating mechanism of a typical mirror galvanometer.

FIGS. 4 and 5 show schematically how the mirror 28 may be mounted in a typical mirror galvanometer. Behind the aperture 35 of FIG. 3 is a metallic plate 41 of magnetic material having a thickness on the order of 0.005 inch. Two zig-zag cuts 42 and 43 are formed in the plate 41 leaving a rectangular portion joined to the main body of the plate by two narrow strips 44 and 45. The rectangular portion is coated with a reflective material such as silver or gold and constitutes the mirror 28. The strips 44 and 45 constitute a resilient pivotal suspension system which permits the mirror 28 to be rotated by an external force but which returns the mirror 28 to its normal position when the force is removed.

FIG. 5 shows the magnetic circuit schematically. One pole of a bar magnet 47 is joined to the casing 48 while the other pole abuts a U shaped pole piece 49, the legs of which lie adjacent to the mirror 28. A coil 50 is wound on the two legs in such directions that a current therethrough increases the magnetic intensity in one leg while decreasing that in the other. Obviously a signal applied to the winding 50 will cause a deflection of the mirror 28 about its pivot axis (the strips 44 and 45).

It will be understood that FIGS. 4 and 5 are not drawn to scale and should be regarded as schematic only. The mirror 28 may be on the order of three-eighths inch square and the cuts 42 and 43 need only be wide enough to provide mechanical clearance.

An example of a mirror galvanometer with a suspension similar to that shown in FIG. 4 and suitable for use in the present invention is available from J. A. Maurer Inc., Long Island City, N.Y., and is identified as model F.

Figure 6:
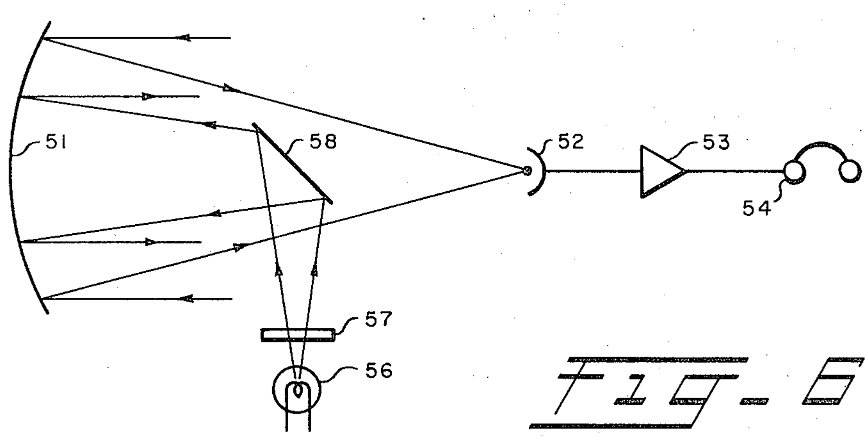
FIG. 6 is a schematic illustration of a receiving unit incorporating a light source.

Turning now to FIG. 6 there is shown one form which the receiving unit 12 of FIG. 1 may take. Modulated light bearing a signal is collected by a concave mirror 51 at the principal focus of which is located a photoelectric cell 52. The cell 52 generates an alternating voltage corresponding to the variations in intensity of the light beam. This voltage is amplified by an amplifier 53 the output of which is connected to any desired device such as a tape recorder or, as illustrated, a telephone receiver 54.

Also shown in FIG. 6 is a light source 56 the light from which passes through an infra red filter 57 to a plane mirror 58 which reflects the light to the concave mirror 51. As before, the distances are selected so that the source 56 is, in effect, at the principal focus of the mirror 51. Accordingly, the light is collimated by the mirror 51 and propagated toward the transmitting station.

The operation of the apparatus of FIG. 2 has previously been described with the source 21 energized to supply the necessary light. Under these circumstances the source 56 is turned off and the signal is recovered by the apparatus of FIG. 6. It may be sometimes desirable to relieve the transmitting station, which may be carried by a foot soldier at a forward observation post, of the burden of the space and weight requirements for a power supply for the source 21. Additionally it may be desirable to decrease the opportunity for detection by the enemy of the widely divergent bean of "lost" light represented by the ray 32 of FIG. 2. Both objectives may be attained simply by turning off the source 21 and turning on the source 56. In such a case the light from the source 56 is collimated by the mirror 51 and transmitted in a narrow beam to the lens 24 of FIG. 2. The reflective strips 25 now act simply as an opaque mask and a bar pattern of alternate light and shadow is formed on the mirror 26 as in the previous case, the only difference being that the light and dark portions are interchanged. However this makes no difference in the operation because, after convergence of the bar pattern on the mirror 28 and its reformation on the lens 24, the light bars will still be half on the reflective strips 25 and half on the spaces therebetween. Oscillation of the mirror 28 by a signal at the microphone 30 will, as before, cause the beam transmitted through the lens 24 toward the receiving station to be amplitude modulated. Reception and recovery of the signal by the apparatus of FIG. 6 is the same in either case.

It is noted that no adjustments are required when changing the mode of operation of the device of FIGS. 2 and 3 from the "active" mode on which the source 21 is used to the "passive" mode in which the source 56 is used. It is only necessary to turn on the desired source and turn off the other one.

Small size is not as important for the receiving unit as for the transmitting unit and greater sensitivity can be obtained by the use of larger components. In one embodiment the mirror 51 was 6 inches in diameter and had a focal length of about 15 inches. Physical layout was similar to the schematic with the photocell 52 mounted on the mirror axis and the light source 56 below. Thus overall dimensions of the apparatus, exclusive of headphones, was about 18 inches long by 7 inches wide by 13 inches deep.

Figure 7:
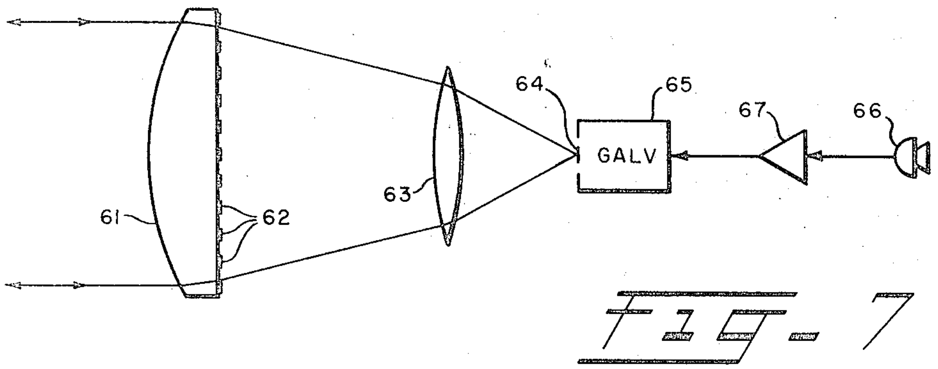
FIG. 7 is a schematic illustration of another form of transmitter unit.

Turning now to FIG. 7 there is shown schematically another form of modulator-transmitter which can be used in place of the apparatus illustrated in FIGS. 2 and 3. However, no light source is included and accordingly the device of FIG. 7 can be used only in the "passive" mode, that is, in conjunction with a light source at the receiving station such as the source 15 of FIG. 1 or the source 56 of FIG. 6.

In FIG. 7 there is shown a positive lens 61 preferably with one flat or nearly flat surface to which is fastened an opaque mask. As shown, thee mask comprises a series of rectangular strips or bars 62 with spaces between equal to the width of the bars although, as in the case of FIG. 2, other mask patterns could be used. The strips 62 may or may not be reflective it being necessary only that they be opaque. Rays of collimated light reaching the lens 61 from the left, as viewed in FIG. 7, are converged by the lens 61 and formed into a pattern of alternate light and shadows by the strips 62. The rays are further converged by a positive lens 63 and brought to a small spot in the mirror 64 of a galvanometer 65, similar to the galvanometer 29 of FIG. 2. A dynamic microphone 66 is connected through an amplifier 67 to the winding of the galvanometer 65. The entire device, exclusive of the microphone 66 and amplifier 67, may be housed in an approximately cylindrical tube 1 inch in diameter and 6 inches long.

In operation, collimated light reaching the instrument from the left is refracted by the lens 61 and formed into a bar pattern by the strips 62. The rays converge as they leave the lens 61, are further refracted by the lens 63 and converted to a spot on the mirror 64. After reflection by the mirror 64 and refraction by the lens 63, the bar pattern is reformed on the flat surface of the lens 61 and the strips 62. As before, the angle of the mirror 64 is selected so that the light bars are one half on the strips 62 and one half on the lens 61. Therefore, an acoustic signal on the microphone 66 causes a modulated light beam to be transmitted back toward the receiving station.

The transmitting units of FIGS. 2, 3 and 7 and the receiving unit of FIG. 6 have been built, tested, and found to be completely satisfactory for most purposes. However, they are comparatively simple devices and have certain shortcomings which may be objectionable in critical applications. First, the widely divergent beam of "lost" light as shown by the ray 32 of FIG. 2 makes detection by unauthorized persons easier than it should be. Second, imperfect collimation of the light and the imperfect formation of the image of the bar pattern limits the signal to noise ratio obtainable.

The divergence of the beam of "lost" light may be reduced by collimating the light from the source in two steps instead of one, as will be more fully explained. The imperfect collimation and the poor image definition have two principal causes. First, the sources 21 and 56, although treated for purposes of explanation as point sources, actually are not point sources of light. The filaments themselves have a significant size and additionally nearby objects such as the mountings and envelopes become hot and radiate infra red energy. Accordingly, the rays do not completely follow the ideal paths indicated in FIG. 2 but spread on both sides of the ideal. Second, the mirrors are spherical and the inherent spherical abberation also causes the rays to deviate from the ideal paths shown. These shortcomings are in a large measure overcome by the embodiment shown in FIG. 8.

Figure 8:
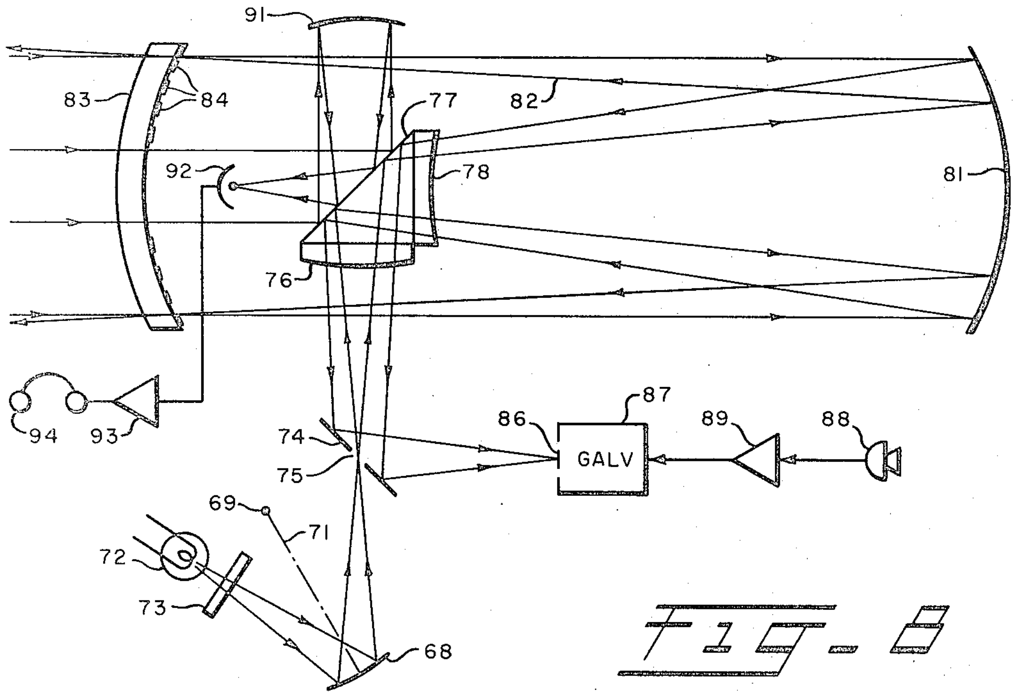
FIG. 8 is a schematic illustration of a transmitter unit including receiving facilities.

Turning now to FIG. 8, there is shown a small spherical mirror 68 the center of curvature of which is shown at 69 on the axis 71. Just off the axis adjacent to the center 69 is located a light source 72 such as a tungsten bulb. Light from the source 72 passes through an infra red filter 73 to the mirror 68 by which it is reflected and brought to a focus at a point the same distance from the mirror and offset from the axis the same amount as the source 72. A plane mirror 74 having a small aperture 75 near the center is positioned with the aperture at the point at which the light is focused. The source 72 is not, of course, a point source and rays other than those shown are emitted. Some of these rays are rejected by failure to strike the mirror 68 and of those striking the mirror 68 only those which reach the aperture 75 in the mirror 74 are utilized, those striking the back of the mirror 74 being rejected. The spot of light appearing at the aperture 75 acts as the light source for the apparatus and since this spot may be made very small (from 0.020 inch to 0.040 inch in diameter) it is an excellent approximation to a point source. This good approximation is enhanced by the physical separation of the source 72 from the mirror 74 by reason of which the mirror is not heated appreciably and therefore does not itself radiate light.

Light from the aperture 75 passes through a small lens 76 and into a prism 77 by which it is totally internally reflected through another small lens 78 to a concave mirror 81. The lenses 76 and 78 and the prism 77 correct for spherical abberation of the mirror 81 in a well known manner, and consequently refract the light rays but very little. A lens system of this general class is shown, for example, in the Acht U.S. Pat. No. 1,967,215.

The sum of the distances from the mirror 81 to the prism 77 and from the prism 77 to the aperture 75 is made less than the focal length of the mirror 81 so that the rays of light from the aperture 75 striking the mirror 81 are reflected in a slightly diverging beam as indicated by the ray 82.

A zero power lens 83 having a concave surface is positioned coaxially with the mirror 81 and the concave surface is coated with a number of reflective strips 84 similar to the strips 25 of FIG. 2. The diverging beam from the mirror 81 strikes the concave surface of the lens 83 and the bars 84. That portion of the beam reaching the lens 83 directly in the spaces between the bars is transmitted without significant refraction in a slightly diverging beam and constitutes light which is "lost" for the purposes of the invention. It is noted however, that the divergence of this beam of "lost" light is far less than the divergence of the "lost" light of FIG. 2 indicated by the ray 32 of that figure.

The curvature of the concave surface of the lens 83 is selected so that the portion of the beam from mirror 81 which strikes the reflective strips 84 is reflected in rays parallel to the common axis of the lens 83 and the mirror 81. Upon reaching the mirror 81 the beam is converged, passes through the lens 78, is reflected by the internal surface of the prism 77, passes through the lens 76, and strikes the plane mirror 74. The mirror 74 is mounted at a convenient angle, such as 45°, to the line joining the prism 77 and the mirror 68, so that the beam from prism 77 is reflected to one side where it strikes the mirror 86 of a galvanometer 87. The length of the light path from the mirror 81 to the prism 77, to the mirror 74 and thence to the mirror 86 is selected to be equal to the focal length of the mirror 81 so that the mirror 86 is effectively at the principal focus of the mirror 81. As in the previously considered embodiments, the light travels back along nearly the same path by which it arrived, the various mirrors being adjusted so that the bar pattern of light is reformed half on the strips 84 and half on the surface of the lens 83. As in the previous cases, an acoustic signal reaching the microphone 88 connected through the amplifier 89 to the galvanometer 87 causes a modulated light beam to be transmitted through the lens 83 toward the receiving station.

The device of FIG. 8 may also be used as a passive modulator simply by turning off the source 73 and utilizing light transmitted from the receiving station. Operation is similar to the operation of the embodiment of FIG. 2.

The apparatus of FIG. 8 is intended primarily as a transmitting unit wherein acoustic signals on the microphone 88 cause a beam of modulated light to be propagated to the receiving station. However, the inclusion of a few additional components permits received modulated light to be converted to acoustic signals.

The central portion of the lens 83 is not used for transmitting purposes and accordingly the reflective strips 84 are applied only to the outer portion as shown. Modulated light received from the left, as viewed in FIG. 8, passes through the lens 83 without significant refraction and strikes the prism 77. The outer plane surface of prism 77 is covered with a reflective coating such as gold to form a plane mirror which reflects the incident light to one side of a concave mirror 91. The light is reflected in a converging beam back to the outer surface of the prism 77 and brought to a focus on a photoelectric cell 92 positioned on the axis between the lens 83 and the prism 77. The photoelectric cell 92 generates an alternating voltage corresponding to the modulation of the received light which voltage is led to an amplifier 93 and then to a set of headphones 94. Thus the apparatus can be used to receive as well as to transmit signals.

It is therefore apparent that the shortcomings mentioned in connection with the embodiment of FIG. 2 are overcome in the embodiment of FIG. 8 by means of three features. First, an excellent approximation to a point source is generated at the aperture 75. Second, the divergence of the beam of "lost" light is greatly reduced by reflecting the light from mirror 81 before it strikes the lens 83. Third, spherical abberation is corrected by means of the lenses 76 and 78 and the prism 77.

Figure 9:
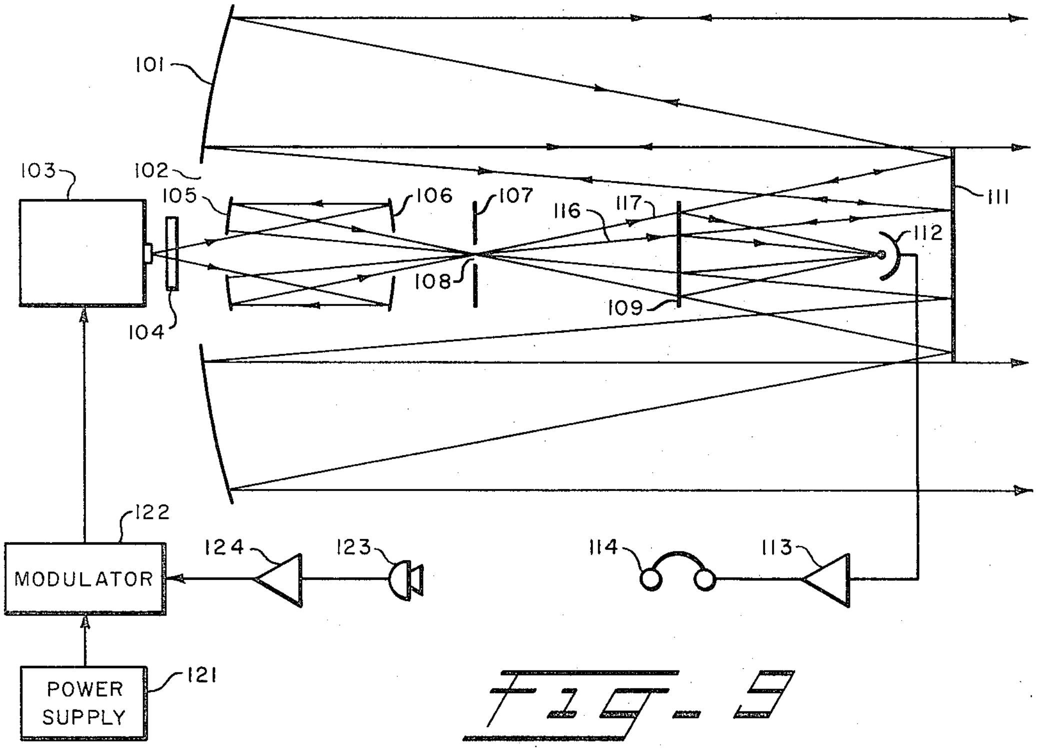
FIG. 9 is a schematic illustration of a receiving unit including transmitting facilities.

Referring now to FIG. 9 there is shown schematically a modified form of receiving unit. A concave spherical mirror 101 has a central aperture 102 adjacent to which, on the convex side, is mounted a light source 103. The source 103 preferably comprises a concentrated arc emitting a large proportion of its energy in the infra red region, and may be similar to a lamp commercially available from Sylvania Electric Products, Inc., New York, N.Y., and identified as model C-25. However, the source 103 could be a tungsten lamp as in the previously described embodiments.

Light from the source 103 passes through an infra red filter 104, the aperture 102 and an aperture in a second concave mirror 105 to the concave surface of third mirror 106. The source 103 is at the principal focus of the mirror 106 so that the light is reflected in substantially parallel rays to the concave surface of the mirror 105. A sheet or mask 107 of opaque material is mounted perpendicular to the common axis of the three above mentioned mirrors and is provided with a small central aperture 108 which lies at the principal focus of the mirror 105. Accordingly, the parallel beams striking the concave surface of mirror 105 are converged to a small spot within the aperture 108. As in the embodiment of FIG. 8, the light within the aperture 108 acts as the source and is an excellent approximation to a point source because of the small size of the aperture 108 (0.020 inch to 0.040 inch) and its physical separation from the source 103.

A circular mask 109 is positioned on the common axis of all of the aforementioned mirrors and is constructed to transmit a portion of the light striking its surface from the left, as viewed in FIG. 9, and to reflect a portion of the light striking its surface from the right. As will be more fully explained various constructios of the partially reflective mask 109 can be employed but for the present it will be assumed that light from the left passes through while light from the right is reflected.

Light from the aperture 108 passes through the mask 109 and strikes a plane mirror 111 from whence it is reflected to the concave surface of the mirror 101. The sum of the axial distances from the aperture 108 to the plane mirror 111 and from the plane mirror 111 to the concave mirror 101 is made equal to the focal length of the mirror 101 so that the diverging rays travelling from the aperture 108 via the plane mirror 111 to the mirror 101 are reflected in a narrow beam and are directed toward the transmitting station.

Modulated light from the transmitting station returns along substantially the same path by which the unmodulated light was transmitted and strikes the mirror 101 in the same region of its surface as the unmodulated light. The mirror 101 reflects the modulated light in a converging beam first to the plane mirror 111, then to the partially reflective mask 109 and thence to a photoelectric cell 112. The various distances are selected so that the photoelectric cell 112 is effectively at the principal focus of the mirror 101. As in the previously described embodiments, the voltage generated by the photocell 112 is amplified by an amplifier 113 and passed to a utilization device such as the headphones 114.

The geometry of the apparatus limits the active area of the mask 109 to an annulus defined by the intersection of the mask 109 with two cones of which the rays 116 and 117 are elements. As can be seen in FIG. 9, any ray which diverges less than the ray 116 would, after reflection by the plane mirror 111 and the concave mirror 101, strike the plane mirror 111 and fail to be propagated toward the transmitting station. Similarly, the ray 117 represents substantially the ray of maximum divergence because of limitations imposed by the sizes of the concave mirror 105 and 106, the plane mirror 111, and the large concave mirror 101. This annular, active portion of the mask must transmit unmodulated light from the aperture 108 in the left to right direction and must also reflect the received modulated light to the photocell. Additionally, the mask 109 should preferably have an opaque portion at and surrounding the center to prevent the direct transmission of light from the aperture 108 to the photocell 112.

Rays of unmodulated light from the apparatus of FIG. 9 are propagated to the transmitting station, modulated, and returned along substantially the same paths. However, it will be realized that, due to the many reflections, ray for ray the returned modulated light paths will deviate somewhat from the corresponding paths of the unmodulated light. Therefore satisfactory operation can be obtained if the active area of the mask 109 is divided into transparent portions and reflective portions. It has been found that the best signal to noise ratio is obtained when the transparent and reflective portions are of equal area. Various configurations can be used. For example, the mask may be made of glass and the active annular area (or the entire mask) covered with parallel rectangular strips of reflective material such as gold, with spaces between strips equal in width to the width of the strips. As another example, a glass mask can be partially covered with small spots of reflective material. Each of these arrangements has been found to be satisfactory. However, a third arrangement, illustrated in FIG. 10, is at present preferred.

Figure 10:
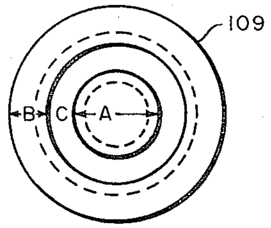
FIG. 10 is a schematic illustration of a mask suitable for use in the unit of FIG. 9.

Referring now to FIG. 10, there is shown schematically an enlarged elevation view of the mask 109 as viewed from the right in FIG. 9. The mask 109 is made of a piece of flat clear glass covered in part with a thin reflective gold coating. The gold coating covers the inner circular portion designated A and the outer annular portion designated B. The intermediate annular portion C is left clear. The dotted lines bound the "active" area of the mask. As shown, the clear portion C lies entirely within the active portion and its area is approximately one half of the active portion.

With the mask of FIG. 10 in place in the apparatus of FIG. 9, light from the aperture 108 passes through the clear portion C and is propagated to the transmitting station. The modulated light returned from the transmitting station will in general fall on the entire active portion of the mask 109 and that part of the light falling on the reflective areas A and B will be brought to a focus on the photoelectric cell 112.

The receiving unit of FIG. 9 has certain advantages over that shown in FIG. 6. The beam of light transmitted is narrower because the use of the mirrors 105 and 106 and the aperture 108 enables the generation of a good approximation to a point source thereby permitting the mirror 101 to collimate the light more accurately. The use of a part transparent part reflective mask 109 allows all of the elements to be placed on the axis thereby affording a more compact physical arrangement. Since but one spherical mirror is used beyond the point source, spherical abberation is not serious and correction therefore has been deemed unnecessary.

The apparatus of FIG. 9 has been designed primarily as a receiving unit but the addition of a few components enables it to be used as a transmitting unit as well. The light source 103 necessarily requires a power supply 121 which is preferably a regulated direct current supply. The current furnished to the light source 103 is controlled by a modulator 122 connected between the power supply 121 and the light source 103. Acoustic signals reaching a microphone 123 cause an alternating voltage to be generated which voltage is amplified by an amplifier 124 the output of which is applied to the modulator 122.

The modulator 122 is conventional and may, for example, comprise a transistor having its emitter-collector circuit in series with the power supply lead and having its conductivity controlled by varying the potential of the base in accordance with the output of the amplifier 124. With such an arrangement it has been found possible to obtain substantial modulation of the light emitted by the source 103 throughout the lower portion of the audio range.

From the foregoing it is apparent that the present invention provides a small, light weight, private communication system requiring but a small amount of power at the transmitting station. While several specific embodimnts have been described, many modifications can be made within the spirit of the invention. It is therefore desired that the protection afforded by letters patent be limited only by the true scope of the appended claims.

What is claimed is:

1. A two station communication system, comprising, a transmitting station, a receiving station, a first light source located at said transmitting station, a second light source located at said receiving station, means at said receiving station for transmitting a beam of light from said second source toward said transmitting station, means at said transmitting station for modulating the light from whichever of said sources may be energized and for transmitting a beam of the light so modulated toward said receiving station, and means at said receiving station for generating a signal in accordance with the modulation of said beam of modulated light.

2. A two station communication system, comprising, a transmitting station, a receiving station, a first light source located at said transmitting station, a second light source located at said receiving station, means at said receiving station for transmitting light from said second source toward said transmitting station, means at said transmitting station for generating a signal, means at said transmitting station for transmitting a beam of light from whichever of said sources may be energized toward said receiving station and for varying the amplitude of said beam in accordance with said signal, and means at said receiving station for receiving said beam of light and for recovering said signal.

3. A light modulator, comprising, a concave surface having portions reflective and the remainder transparent, a light source, means for illuminating said surface with a diverging beam from said source, whereby a portion of the light is transmitted and the remainder reflected, the curvature of said concave surface being such that the reflected light is collimated, thereby forming a pattern of light and shadow, a mirror, means for moving said mirror in accordance with a signal, optical means for converging said reflected pattern of light and shadow to a spot on said mirror, and means including said optical means for receiving light reflected by said mirror and for reforming said pattern of light on said concave surface with the light portion of said pattern partially on and partially off said reflective portions, whereby movement of said mirror causes varying amounts of light to be transmitted.

4. A light modulator, comprising, a zero power lens having a concave surface, a plurality of discrete reflective elements fastened upon and covering a portion of said concave surface thereby forming a first concave mirror, a light source, means for illuminating said surface with a diverging beam from said source, the curvature of said mirror being such that the light reflected by said reflecting elements is collimated, a second concave mirror mounted coaxial with said first mirror and with the two concave surfaces facing each other, a plane mirror pivotally mounted effectively at the principal focus of said second concave mirror with its surface substantially perpendicular to paraxial rays from said second concave mirror, the pivot axis being parallel to the surface of said plane mirror, and means for oscillating said plane mirror about said pivot axis in accordance with intelligence.

5. A light modulator, comprising, a zero power lens having a concave surface, a plurality of parallel rectangular strips of reflective material on said concave surface arranged in spaced apart relationship thereby forming a first concave mirror, a light source, means for illuminating said surface with a diverging beam from said source, the curvature of said mirror being such that the light reflected by said strips is collimated, a second concave mirrir mounted coaxial with said first mirror and with the two concave surfaces facing each other, a plane mirror, pivotal mounting means for said plane mirror, said mounting means including means for resiliently urging said plane mirror to a normal angular position at which the surface of said plane mirror is substantially perpendicular to paraxial rays from said second concave mirror and at which one point on said plane mirror is effectively at the principal focus of said second concave mirror, the axis of said pivotal mounting means being parallel to the surface of said plane mirror and parallel to the projection of said strips on a plane perpendicular to the axis of said first concave mirror, and means for causing said plane mirror to oscillate about said axis of said mounting means in response to a signal.

6. A light modulator, comprising, a zero power lens having a concave surface, a plurality of discrete reflective elements on said concave surface forming a first concave mirror, a source of light positioned effectively at the principal focus of said mirror whereby a plurality of beams of collimated light are formed, a second concave mirror coaxial with said first mirror positioned to receive said beams of light, a plane mirror positioned effectively at the principal focus of said second concave mirror, and means for moving said plane mirror in accordance with intelligence.

7. A light modulator, comprising, a zero power lens having a concave surface, a plurality of discrete reflective elements fastened upon and covering a portion of said concave surface thereby forming a first concave mirror, a light source mounted effectively at the principal focus of said first concave mirror, a second concave mirror coaxial with said first concave mirror mounted with the two concave surfaces facing each other, a plane mirror mounted effectively at the principal focus of said second concave mirror with its surface substantially perpendicular to paraxial rays from said second mirror, and means for moving said plane mirror in accordance with intelligence.

8. A light modulator, comprising, a zero power lens having a concave surface, a plurality of discrete reflective elements fastened upon and covering a portion of said concave surface thereby forming a first concave mirror, a light source positioned effectively at the focal point of said mirror, a second concave mirror coaxial with said first concave mirror mounted with the two concave surfaces facing each other, a plane mirror positioned effectively at the focal point of said second concave mirror, pivotal mounting means for said plane mirror resiliently urging said plane mirror to a normal position with the plane of the surface of said plane mirror symmetrical to rays of light from said second concave mirror, the pivot axis of said pivotal mounting means being parallel to the surface of said plane mirror, and means for oscillating said plane mirror about said pivot axis in accordance with intelligence.

9. A light modulator, comprising, a zero power lens having a concave surface, a plurality of parallel rectangular strips of reflective material on said concave surface arranged in spaced apart relationship thereby forming a first concave mirror, a light source positioned effectively at the focal point of said mirror, a second concave mirror coaxial with said first concave mirror mounted with the two concave surfaces facing each other, a plane mirror positioned effectively at the focal point of said second concave mirror, pivotal mounting means for said plane mirror resiliently urging said plane mirror toward a normal position at which the surface of said plane mirror is symmetrical to rays of light from said second concave mirror, the pivot axis of said pivotal mounting means being parallel to the surface of said plane mirror and parallel to the projection of said strips on a plane perpendicular to the axis of said first concave mirror, and means for moving said mirror about said pivot axis in accordance with a signal.

10. A light modulator, comprising, a zero power lens having a concave surface, a plurality of parallel rectangular strips of reflective material on said concave surface arranged in spaced apart relationship thereby forming a first concave mirror, a first plane mirror positioned on the axis of said first concave mirror and inclined thereto, a light source located off said axis in such a position that light from said source striking said plane mirror is reflected to said first concave mirror, the combined distances from said source to said plane mirror and from said plane mirror to said concave mirror being equal to the focal length of said concave mirror, a second concave mirror coaxial with said first concave mirror mounted with the two concave surfaces facing each other, a second plane mirror positioned on the common axis of said two concave mirrors and inclined thereto, a third plane mirror located off said common axis in such position that light rays parallel to said common axis striking said second concave mirror are reflected first to said second plane mirror and then to said third plane mirror, pivotal mounting means for said third plane mirror resiliently urging said third plane mirror toward a normal position at which the surface of said third plane mirror is symmetric to rays of light from said second concave mirror, the pivot axis of said pivotal mounting means being parallel to the surface of said third plane mirror and parallel to the projection of said strips on a plane perpendicular to said common axis, and means for oscillating said third plane mirror about said pivot axis in accordance with intelligence.

11. Optical apparatus comprising, a zero power lens having a concave surface, a plurality of discrete reflective elements on said concave surface, a light source, a plane mirror, triple purpose optical means for transmitting light from said source to said lens and said elements thereby forming a pattern of light and shadow, for converging said pattern to a spot on said plane mirror and for reforming said pattern on said lens and said elements after reflection by said plane mirror, and means for moving said plane mirror in accordance with a signal whereby the light transmitted through said lens is modulated.

12. A light modulator, comprising, a zero power lens having a concave surface, a plurality of discrete reflective elements fastened upon and covering a portion of said concave surface thereby forming a first concave mirror, a second concave mirror mounted coaxially with said first concave mirror with the two concave surfaces facing each other, a light source positioned effectively at a distance from said second concave mirror less than the focal length of said second concave mirror whereby diverging rays from said source striking said second mirror are reflected in a diverging beam to said first concave mirror, the curvature of said first mirror being such that the above mentioned diverging beam is reflected in parallel rays to said second concave mirror, a plane mirror positioned effectively at the principal focus of said second concave mirror, and means for moving said plane mirror in accordance with intelligence.

13. A light modulator, comprising, a zero poweer lens having a concave surface, a plurality of parallel rectangular strips of reflective material on said concave surface arranged in spaced apart relationship thereby forming a first concave mirror, a second concave mirror mounted coaxially with said first concave mirror with the two concave surfaces facing each other, a light source positioned effectively at a distance from said second concave mirror less than the focal length of said second concave mirror whereby diverging rays from said source striking said second mirror are reflected in a diverging beam to said first concave mirror, the curvature of said first mirror being such that the above mentioned diverging beam is reflected in parallel rays to said second concave mirror, a plane mirror positioned effectively at the focal point of said second concave mirror, pivotal mounting means for said plane mirror resiliently urging said plane mirror to a normal position at which the surface of said plane mirror is symmetric to rays of light from said second concave mirror, the pivot axis of said pivotal mounting means being parallel to the surface of said plane mirror and parallel to the projection of said strips on a plane perpendicular to the axis of said first concave mirror, and means for oscillating said plane mirror about said pivot axis in response to a signal.

14. A light modulator, comprising, a zero power lens having a concave surface, a plurality of discrete reflective elements fastened upon and covering a portion of said concave surface thereby forming a first concave mirror, a second concave mirror mounted coaxially with said first concave mirror with the two concave surfaces facing each other, reflective means positioned on the common axis of said mirrors and inclined thereto with the reflective surface toward said second concave mirror, a first plane mirror having a central aperture positioned off said common axis and inclined to the direction of propagation of light from said reflective means, a light source, optical means for directing light from said source through said aperture to said reflective means whereby the light within said aperture approximates a point source of light, the combined distances from said second concave mirror to said reflective means and from said reflective means to said aperture being less than the focal length of said second concave mirror whereby light from said aperture reaching said second concave mirror is reflected in a diverging beam to said first concave mirror, the curvature of said first concave mirror being such that the above mentioned diverging beam is reflected in parallel rays to said second concave mirror, a second plane mirror inclined to said first plane mirror sufficiently to lie in a plane substantially perpendicular to the direction of propagation of light reflected by said second plane mirror, and means for varying the angular orientation of said second plane mirror in response to a signal.

15. Apparatus according to claim 14 in which said reflecting means is a right angle prism.

16. Apparatus according to claim 15 further comprising a negative lens on that face of said prism facing said second concave mirror and a positive lens on that face of said prism facing said first plane mirror.

17. A light modulator, comprising, a transparent member for receiving light from and transmitting light toward a remote point, an opaque member positioned in a portion of the path of the received and transmitted light for forming from received light a pattern of light and shadow, a mirror, means for displacing said mirror from a normal position in accordance with a signal, and optical means interposed in the light path between said mirror and said opaque member for performing the dual function of converging said pattern to a spot on said mirror and of reforming said pattern on said opaque member after reflection by said mirror.

18. A light modulator, comprising, a lens for receiving light from and transmitting light toward a remote point, a plurality of discrete opaque members mounted in the path of the received and transmitted light whereby the received light is broken into a pattern of light and shadow, a plane mirror, optical means interposed in the light path between said plane mirror and said opaque members for converging said pattern to a spot on said mirror and for reforming said pattern on said opaque members after reflection by said mirror with the light portions partially on and partially off said opaque members, pivotal mounting means for resiliently supporting said plane mirror with its surface substantially perpendicular to the paraxial rays from said optical means, the pivot axis of said mounting means being parallel to the surface of said plane mirror, and means for oscillating said plane mirror about said pivot axis in accordance with a signal.

19. Optical apparatus, comprising, means for forming a pattern of light and shadow from incident collimated light, a concave mirror positioned with its axis parallel to the rays of light passed by said means, a plane mirror positioned effectively at the principal focus of said concave mirror, and means for moving said plane mirror in accordance with intelligence.

20. Optical apparatus, comprising, a concave mirror, a plurality of discrete opaque elements positioned about the axis of said mirror opposite the concave surface thereof whereby collimated light striking said elements is broken into portions of light and shadow before striking said mirror, a plane mirror positioned effectively at the principal focus of said concave mirror with its surface resiliently held in a normal position substantially perpendicular to paraxial rays from said concave mirror, and means for angularly displacing said mirror about said normal position in response to a signal.

21. Optical apparatus, comprising, a concave mirror, a plurality of discrete opaque elements positioned about the axis of said mirror opposite the concave surface thereof whereby collimated light striking said elements is broken into a pattern of light and shadow before striking said mirror, a plane mirror positioned off the axis of said concave mirror, means on said axis between said elements and said concave mirror for deviating light from said concave mirror to said plane mirror and vice versa, the combined distances from said concave mirror to said means and from said means to said plane mirror being equal to the focal length of said concave mirror, mounting means for resiliently holding said plane mirror in a normal position substantially perpendicular to paraxial rays from said concave mirror, and means for angularly displacing said plane mirror from said normal position in response to a signal.

22. Optical apparatus, comprising, a concave mirror, a plurality of discrete opaque elements positioned about the axis of said mirror opposite the concave surface thereof whereby light collimated parallel to said axis striking said elements is broken into a pattern of light and shadow before striking said mirror, a plane mirror positioned off said axis, means on said axis between said elements and said concave mirror for performing the dual function of both deviating light from said concave mirror to said plane mirror and vice versa and of correcting for the inherent spherical abberation of said mirror, the combined distances from said concave mirror to said means and from said means to said plane mirror being equal to the focal length of said concave mirror, mounting means for resiliently holding said plane mirror in a normal position substantially perpendicular to paraxial rays from said concave mirror, and means for angularly displacing said plane mirror from said normal position in response to a signal.

23. Apparatus according to claim 22 in which said means on said axis comprises a right angle prism having a negative lens on that surface facing said concave mirror and a positive lens on that surface facing said plane mirror.

24. Optical apparatus, comprising, a lens system including first and second positive lenses mounted on a common axis, a plane mirror mounted on said axis at the focal point of said lens system and held resiliently in a normal angular position substantially perpendicular to said axis, a plurality of discrete opaque members mounted about said axis, and means for angularly displacing said plane mirror from said normal position in response to a signal.

25. Optical apparatus, comprising, a lens system including first and second positive lenses mounted on a common axis, a plane mirror positioned on said axis at the focal point of said lens system, pivotal mounting means for said plane mirror resiliently urging said plane mirror toward a normal angular position substantially perpendicular to said axis, a plurality of discrete opaque members mounted about said axis between said first and second lenses, and means for oscillating said plane mirror on said pivotal mounting means in accordance with intelligence.

26. Optical apparatus, comprising, a lens system including first and second positive lenses mounted on a common axis, a plane mirror positioned on said axis at the focal point of said lens system, a plurality of parallel rectangular strips of opaque material fastened on one surface of one of said lenses and arranged in spaced apart relationship whereby collimated light parallel to said axis incident on said lens system is broken into a pattern of light and shadow which pattern is converted to a spot on the surface of said plane mirror, pivotal mounting means for said plane mirror resiliently urging said plane mirror to a normal position substantially perpendicular to said common axis, the pivot axis of said pivotal mounting means being parallel to the surface of said plane mirror and parallel to the projection of said strips on a plane perpendicular to said common axis, whereby the light forming said spot is reflected and said pattern is reformed in the plane of said strips, and means for moving said plane mirror about said pivot axis in accordance with a signal, whereby a beam of modulated light is transmitted.

27. A new article of manufacture comprising, a converging optical element, a light source positioned effectively at the focal point of said element whereby light from said source is collimated and transmitted to a remote point, and photosensitive means also positioned effectively at the focal point of said optical element for generating a signal in accordance with intensity variations of light incident thereon.

28. A new article of manufacture, comprising, a concave mirror, a light source positioned effectively at the focal point of said mirror whereby light from said source is collimated and propagated toward a remote point, and photosensitive means positioned at the focal point of said mirror for generating a signal in accordance with intensity variations of light incident thereon.

29. Optical apparatus, comprising, a concave mirror, a light source, reflective means positioned on the axis of said mirror and inclined thereto for deviatingg light from said source so as to strike said mirror whereby light from said source is collimated and transmitted toward a remote point, and photosensitive means positioned at the focal point of said mirror for generating a signal in accordance with intensity variations of light incident thereon.

30. Optical apparatus, comprising, a concave mirror, a light source positioned effectively at the principal focus of said mirror, a partially transparent mask positioned on the light path between said source and said mirror, and photosensitive means for generating a signal in accordance with variations in light incident thereon, said photosensitive means being positioned in a portion of said light path on the opposite side of said mask from said source and at the same distance from said mask as said source, said mask having a reflective portion on that surface facing said photosensitive means, whereby a portion of the light from said source is transmitted through said mask to said concave mirror and then toward a remote point and whereby a portion of the light from said remote point is reflected by said concave mirror and said reflective portion of said mask to said photosensitive means.

31. Optical apparatus, comprising, a concave mirror, a light source positioned on the axis of said mirror, photosensitive means positioned on said axis for generating a signal in accordance with variations of the intensity of light incident thereon, and a partially transparent mask positioned on said axis between and equidistant from said source and said photosensitive means, said mask having a reflective portion on the surface facing said photosensitive means, the light path distances between said source and said concave mirror and between said photosensitive means and said concave mirror each being selected to be equal to the focal length of said mirror.

32. Optical apparatus, comprising, a concave mirror, a light source on the axis of said mirror, an opaque mask having a small central aperture positioned on said axis, optical means for focusing light from said source to a small spot within said aperture whereby said spot approximates a point source of light, photosensitive means positioned on said axis for generating a signal in response to variations of the intensity of light incident thereon, a partially transparent mask positioned on said axis between and equidistant from said opaque mask and said photosensitive means, said partially transparent mask being partially coated with reflective material on that surface facing said photosensitive means, and a plane mirror perpendicular to and positioned on said axis on the same side of said partially transparent mask as said photosensitive means but farther away with the reflective surface of said plane mirror facing both said partially transparent mask and the reflective surface of said concave mirror, the sum of the distances from said concave mirror to said plane mirror to said partially transparent mask to said opaque mask and the sum of the distances from said concave mirror to said plane mirror to said partially transparent mask to said photosensitive means each being selected to be equal to the focal length of said concave mirror, whereby a portion of the light emanating from said aperture in said opaque mask is transmitted through said partially reflective mask to said plane mirror, reflected by said plane mirror to said concave mirror from which it is reflected in a narrow beam and propagated toward a remote point and whereby light received from said remote point is reflected and converged by said concave mirror, refelcted by said plane mirror to said partially transparent mask and thence to said photosensitive means which generates a signal corresponding to intensity variations in the received light.

33. A transmitter-receiver for a communication system, comprising, a zero power lens having concave and convex surfaces, a plurality of discrete reflective elements on said concave surface, a light source, a plane mirror, triple purpose optical means for transmitting light from said source to said lens and said elements thereby forming a pattern of light and shadow, for converging said pattern to a spot on said plane mirror and for reforming said pattern on said lens and said elements after reflection by said plane mirror, means for moving said plane mirror in accordance with a signal whereby the light transmitted through said lens in the direction of said concave surface to said convex surface is modulated, photosensitive means for generating a signal in accordance with variations of the intensity of light falling thereon, and auxiliary optical means including an element of said triple purpose optical means for concentrating light incident upon said convex surface onto said photosensitive means.

34. A transmitter-receiver for a communication system, comprising, an electric source of light, a power supply for said source, means for varying the amount of power furnished to said source in accordance with intelligence whereby the light emitted by said source is modulated, photosensitive means for generating a signal in accordance with variations in intensity of light incident thereon, and optical means for collimating the light emitted by said source and directing the collimated light toward a remote point and for concentrating light from said remote point upon said photosensitive means said optical means including opaque means positioned to prevent direct illumination of said photosensitive means by said source of light.

35. A transmitter-receiver for a communication system, comprising, an electrical source of light, a power supply for said source, means for varying the amount of power furnished to said source in accordance with a signal whereby the light emitted by said source is modulated, a concave mirror, a partly transparent and partly reflective mask interposed in the light path between said source and said concave mirror whereby a portion of the light from said source is transmitted through said mask to said mirror and reflected in a beam directed to a remote point, and photosensitive means for generating a signal in accordance with the variations of the intensity of light incident thereon, said photosensitive means being positioned to receive light from said remote point after reflection by said concave mirror and said mask.

* * * * *